(12) United States Patent
Morikawa et al.

(10) Patent No.: US 6,771,388 B1
(45) Date of Patent: Aug. 3, 2004

(54) HALFTONE GRADATION PROCESSING METHOD AND APPARATUS

(75) Inventors: Yukio Morikawa, Kawasaki (JP); Jun Moroo, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/421,227

(22) Filed: Oct. 20, 1999

(30) Foreign Application Priority Data

Feb. 24, 1999 (JP) .......................................... 11-045787

(51) Int. Cl.[7] .............................. B41B 19/00; B41J 2/00; G06F 15/00; G06K 1/00
(52) U.S. Cl. ...................... 358/1.5; 358/3.21; 358/3.22; 382/270; 382/271; 382/272; 382/273
(58) Field of Search ................................ 358/1.9, 3.03, 358/3.05, 3.22, 3.21, 1.5; 382/252; 345/616

(56) References Cited

U.S. PATENT DOCUMENTS

| | | | |
|---|---|---|---|
| 5,835,687 A | * 11/1998 | Brown et al. ................. | 358/1.9 |
| 6,625,327 B1 | * 9/2003 | Ohshima et al. ............ | 382/270 |
| 2001/0046058 A1 | * 11/2001 | Yamamoto et al. .......... | 358/1.9 |
| 2001/0050780 A1 | * 12/2001 | Ohshima ..................... | 358/1.9 |
| 2002/0039200 A1 | * 4/2002 | Yamamoto .................. | 358/3.03 |
| 2002/0089696 A1 | * 7/2002 | Yamamoto .................. | 358/3.05 |
| 2003/0090728 A1 | * 5/2003 | Schramm et al. .......... | 358/3.04 |

OTHER PUBLICATIONS

Knox, K. T.,; Eschbach, Reiner; "Threshold modulation in error diffusion", Jul., 1993, Journal of Electronic Imaging, vol. 2(3), pp. 185–192.*
Knox, K. T.,; Eschbach, Reiner, "Analysis of Threshold Modulation in Error Diffusion", 1992, IS&T's Eighth International Congress on Advances in Non–Impact Printing Technologies, pp. 280–282.*
Patent Abstracts of Japan, English language reference of JP 3–34772, p. 67 E 1061.
Patent Abstracts of Japan, English language reference of JP 4–54768, p. 102 E 1213.

* cited by examiner

Primary Examiner—Kimberly Williams
Assistant Examiner—Melanie M. Vida
(74) Attorney, Agent, or Firm—Staas & Halsey LLP

(57) ABSTRACT

A halftone gradation processing method reduces or eliminates the discontinuous gradation reproduction in comparison with conventional error diffusion. A halftone gradation processing method includes obtaining a position and a pixel value of a target pixel in an input image, correcting the pixel value, selecting the closest threshold to the corrected pixel value from among usable thresholds assignable to the pixel value, calculating an error between the corrected pixel value and the selected threshold, and diffusing the error around the target pixel, the pixel value correcting being corrected by the diffused error, and the selected threshold being output to an output device which may handle the assigned thresholds.

6 Claims, 4 Drawing Sheets

K1　　　　　　　K2

CONVENTIONAL ERROR DIFFUSION

INVENTIVE ERROR DIFFUSION

HALFTONE GRADATION PROCESSING METHOD AND APPARATUS

BACKGROUND OF THE INVENTION

The present invention relates generally to processing of variable gray level images, and more particularly to error diffusion working as a multi-valued gradation reproduction method. The inventive error diffusion is broadly applicable to printers as a single unit, and those copiers, facsimile machines, computer systems, and word processors which include printing functions, and combinations thereof.

The error diffusion is one typical example among various proposed halftone gradation processing approaches for gradation reproduction of variable gray level images. The error diffusion may be used, for example, to view continuous gradation images on a binary display, and to generate bit maps for use with inkjet and laser printers. The error diffusion typically includes the steps of obtaining a position and pixel value (0 through 255) of a target pixel in a 256 gradation input image (which is read out, for example, by a scanner), obtaining an optimal pixel value of the target pixel in an output palette (i.e., an output device of a printer etc.), calculating for the target pixel a difference (i.e., error) between the input image and the optimal pixel value, and adding (i.e., diffusing) a fraction of the error to pixels around the target pixel in the input image.

An optimal pixel value is selected from prefixed thresholds that are inherent to the output device. For example, a three gradation printer has thresholds of 0, 127 and 255. The diffusion (or error) matrix determines how much of error is to be distributed to which surrounding pixel. If a pixel value of the next target pixel (for example, a next pixel on the previous target pixel's right) is corrected as a result of an addition to a fraction of the error from the previous target pixel, a difference between the corrected pixel value and the optimal pixel value with respect to the target pixel may become an error.

However, the conventional error diffusion always selects the closest threshold to a pixel value of the target pixel, resulting in an output image having a discontinuous part in the gradation reproduction. For example, when a monochromatic gradation image that has experienced the halftone gradation processing according to the conventional error diffusion is output from the aforementioned three-gradation printer, the printing result contains a thick painted portion since the error diffusion outputs only a value of 127 for pixel values close to 127.

BRIEF SUMMARY OF THE INVENTION

Accordingly, it is an exemplified general object of the present invention to provide a novel and useful error diffusion in which the above disadvantages are eliminated.

Another exemplified and more specific object of the present invention is to provide a halftone gradation processing method that eliminates or reduces the discontinuity in the gradation reproduction in comparison with the conventional error diffusion.

In order to achieve the above objects, the halftone gradation processing method of the present invention comprises the steps of obtaining a position and a pixel value of a target pixel in an input image, correcting the pixel value, selecting the closest threshold to the corrected pixel value from among usable thresholds assignable to the pixel value, calculating an error between the corrected pixel value and the selected threshold by utilizing a personal computer, and diffusing the error around the target pixel, the pixel value correcting step being corrected by the diffused error, and the selected threshold being output to an output device which may handle the assigned thresholds.

A computer-readable recording medium according to one aspect of the present invention stores the above halftone gradation processing method. A processing system of the present invention includes such a computer-readable recording medium and a processor that executes the halftone gradation processing method. A recording device of the present invention includes an output part that outputs the input image in accordance with the halftone gradation processing method.

According to the halftone gradation processing method of the present invention, all the thresholds are not always usable but may be prohibited from being used under a predetermined condition, preventing the continuous selection of the same threshold.

Other objects and further features of the present invention will become readily apparent from the following description and accompanying drawings.

BRIEF DESCRIPTION OF DRAWINGS

Embodiments of the present invention will be described in more detail, below, with reference to the accompanying drawings, in which.

DETAILED DESCRIPTION OF PREFERRED EMBODIMENTS

Figure 2:
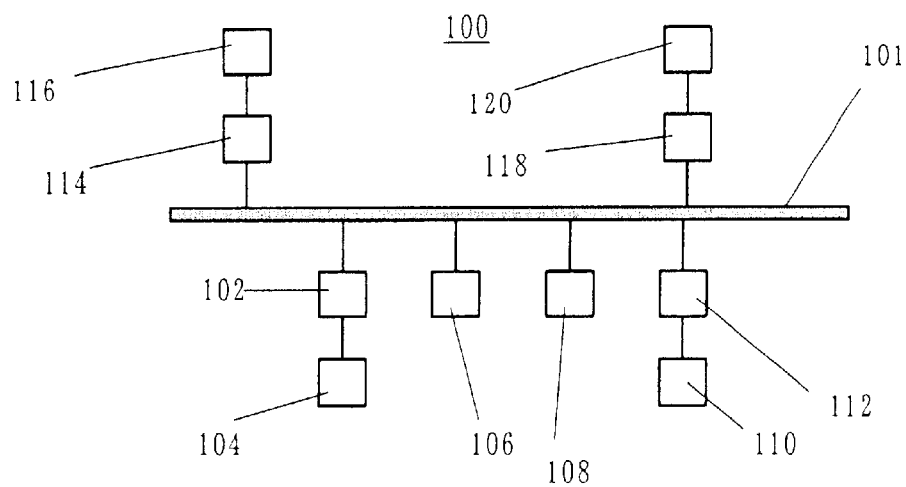
FIG. 2 is a block diagram for explaining the personal computer system which executes the halftone gradation processing method shown in FIG. 1.
Figure 3:
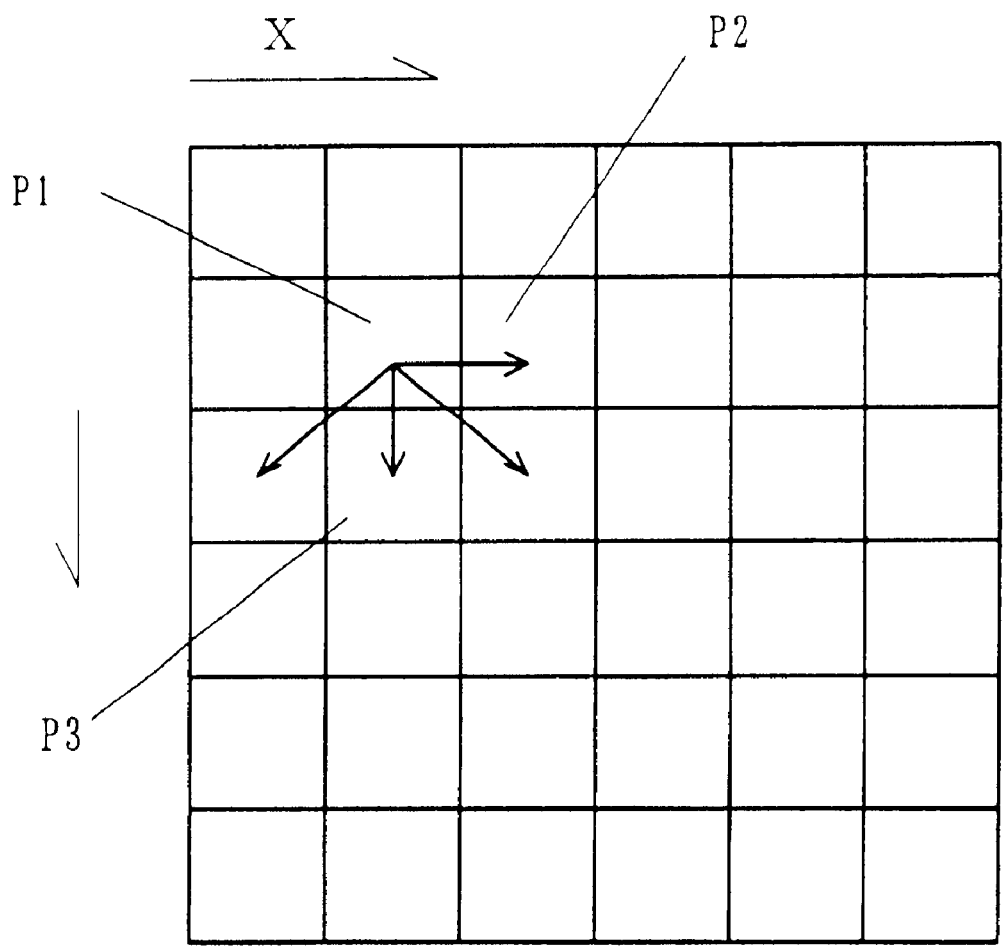
FIG. 3 is a pixel matrix plane view used to explain the halftone gradation processing method shown in FIG. 1.

A description will be given of the halftone gradation processing method of the present invention with reference to FIGS. 1–3. This embodiment uses as an example a personal computer 100 connected to a scanner 116 and an inkjet printer 120.

The personal computer 100 has a PCI bus 101 which is connected to a hard disc drive 104, a CPU 106, and a RAM 108 via a first interface 102 (for example, an IDE interface). The PCI bus 101 is also connected to a removable memory drive 110 via a second interface 112 (for example, a SCSI interface), the scanner 116 via a third interface 114 (for example, a SCSI interface), and the inkjet printer 120 via a printer interface 118. The hard disc (drive) 104 and the removable memory 110 may be internal or external to the personal computer 100. General structures and operations of these components are well-known in the art, and thus only a portion relevant to the present invention will be discussed below omitting a detailed description of these components.

The halftone gradation processing method is stored in a recording medium, such as the hard disc 104 and a removable memory in the removable memory drive 110 (such as, a floppy disc and a CD-ROM), and may be expressed as a program which runs in accordance with an operation system (OS), such as Windows 98®. A concrete example of such a program will be discussed later. The program may constitute part of a printer driver or be separated from the printer driver. In accordance with the OS stored in the hard disc 104, the halftone gradation processing method of the present invention is read, when it is run, out of the hard disc 104 to the RAM 108, and executed by the CPU 106.

A description will now be given of an operation where an image read out by the scanner 116 is stored in the hard disc 104, and then output to the ink jet printer 120. Referring to FIG. 1, the halftone gradation processing method of the present invention initially determines a position and pixel value of a target pixel in an input image (step 1002). A counter (not shown) in the personal computer 100 calculates the number of pixels (i.e., a pixel matrix) in the input image. The counter may be realized by hardware and/or software. In the x*y pixel matrix, x usually increases right and y usually increases down, the starting place may be monochromatic or multicolor. It may use, if multicolored, red, green and blue values, but this embodiment illustrates a monochromatic image for description purposes. FIG. 3 shows an exemplified pixel matrix of an input image with a target pixel designated P1.

Next, the pixel value is corrected when an error for the previous target pixel has been diffused (step 1004). The pixel at the starting place has not been corrected. The error diffusion will be described later. For description purposes, suppose that the current target pixel, P1, is not corrected.

Next, the closest threshold to the corrected pixel value among printer's thresholds that are not prohibited (or usable) is selected (step 1006). The inkjet printer 120 for use with this embodiment is a four gradation printer having prefixed thresholds of 0, 85, 170 and 255. In addition, this embodiment characteristically prohibits a threshold corresponding to a next pixel on a target pixel's left, right, upper and lower side from being selected from a threshold of the target pixel except for the maximum and minimum thresholds, 255 and 0. Here, suppose the target pixel P1 is prohibited to select printer's threshold 170. If the corrected pixel value (although it is not corrected this time) is 80, the closest threshold 85 will be selected. A selector (not shown) in the personal computer 100 calculates the selected value. The selector may be realized by appropriate hardware and/or software. An error between the corrected pixel value 80 and the selected threshold 85 is calculated (step 1008). The error is as follows: 80–85=–5.

This error is diffused according to an error matrix and added to a previously diffused value (step 1010). Any error matrix is applicable to the present invention. The error matrix has been already fixed as part of the inventive halftone gradation processing method in the hard disk 104 etc., or stored after a user arbitrarily sets it. For example, the error matrix diffuses an error to four pixels which are next pixels on target pixel P1's right (i.e., P2), lower (i.e., P3), lower-right diagonal, and lower-left diagonal by 20%, 40%, 20%, and 20%, respectively. Without any previous diffusion, 20% of –5, that is, –1 is diffused to the next pixel P2 on the target pixel P1's right, and –2 is diffused to the next lower pixel P3.

Figure 1:
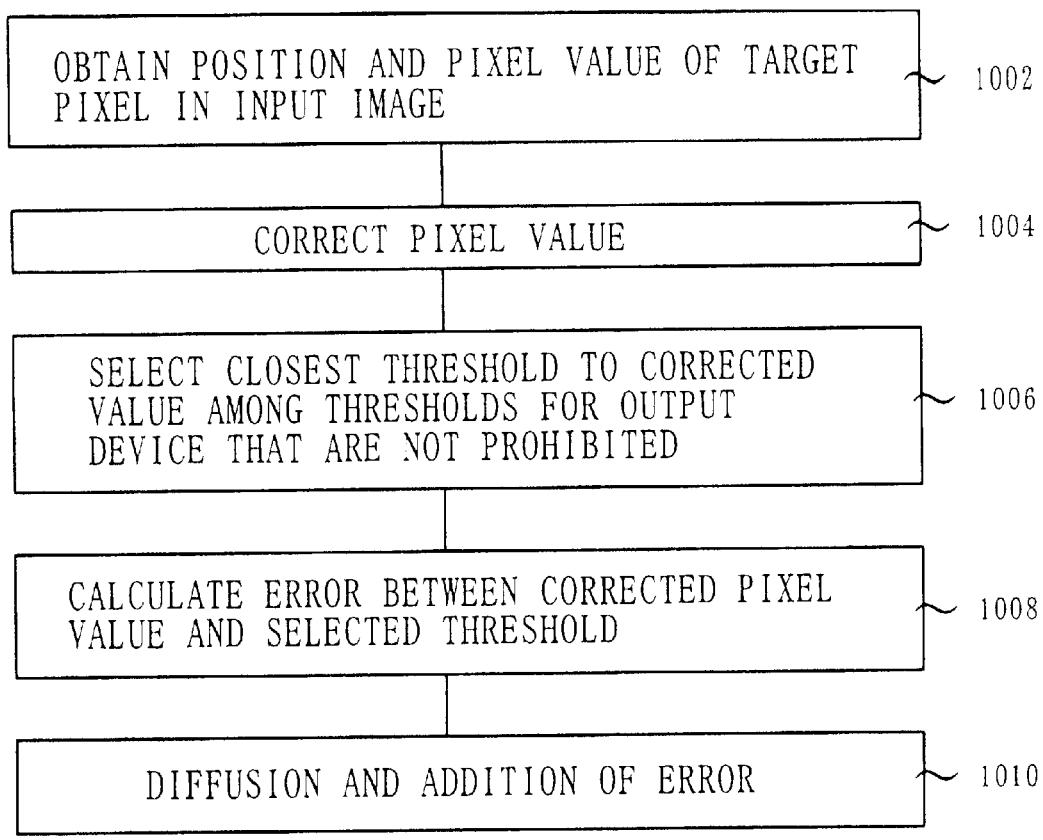
FIG. 1 is a flowchart schematically showing the halftone gradation processing method of the invention.

If the next target pixel is the pixel P2 that is a next pixel on target pixel P1's right, a similar procedure to FIG. 1 is performed for the target pixel P2. The target pixel P2 has an original pixel value of 81(step 1002), the pixel value is corrected to 80 by –1 (step 1004). Next follows the step 1006.

Since a threshold of 85 was selected to the previous target pixel P1, next pixels on the previous target pixel P1's upper, lower, left and right cannot select a threshold value of 85. In other words, a selection of threshold 85 is prohibited for the target pixel P2. Accordingly, the selector selects threshold 0 which is the closest the corrected pixel value among printer's thresholds 0, 170, and 255 that are not prohibited (step 1006). A control value (e.g., a current value) corresponding to the threshold selected at the step 1006 is output to the printer 120. Thereby, the printer 120 may output this result.

Then, the error +80 is diffused. For example, 20% of +80, that is, +16 is diffused to pixel P2's lower left pixel P3, and added to the error diffusion result with respect to the pixel P1, i.e., –2 to be +14 (step 1010). Then, the procedure shown in FIG. 1 is repeated for all the pixels in the input image for example, by transferring to the right next pixel to the target pixel P2. Thereby, a 256-gradation input image is converted to a four-gradation image. As noted, the threshold 0 is not prohibited to the right next pixel to the pixel P2, because the maximum and minimum thresholds are set so as to be always selectable.

Prohibited pixel positions for the output device may be freely established depending upon the total number of thresholds. For example, suppose an eight-gradation printer outputs 256-gradation images having pixel values of 0 to 255, by using thresholds 0, 36, 73, 109, 146, 182, 219, and 255 for respective gradations. Pixel positions of the prohibited thresholds may cover, in this case, upper left, upper right, lower left, and lower right positions in addition to next pixels on the target pixel's upper, lower, left and right, so that these positions cannot use the same threshold as the target pixel except for the maximum and minimum threshold values of 0 and 255.

Even in this case, the procedure shown in FIG. 1 may be employed as it is. For example, in FIG. 3, if upper left pixel has 146, upper pixel 36, upper right 109, and left 109, then 36, 109 and 146 cannot be used for the target pixel P1. When the target pixel has the corrected pixel value of 80, the selector selects the closest threshold 73. Then, the error matrix diffuses the error +7. A 256-gradation image may be converted into an eight gradation image and output from the printer 120 as a result of repeating the above procedure for all the pixels in the input image.

Figure 4:
FIG. 4 is a diagram generated by a scanner which reads a photograph which compares the conventional error diffusion method and the halftone gradation processing method shown in FIG. 1.
Figure 4:
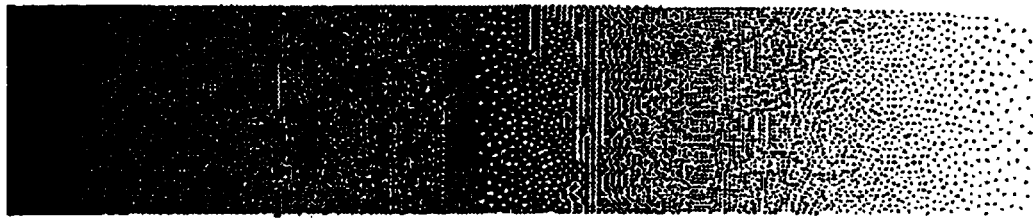

FIG. 4 shows a comparison between a result by a multiple gradation output device using the conventional error diffusion and a result by the same multiple gradation output device using the inventive halftone gradation processing method, with respect to a white to black gradation input image. FIG. 4 is a scan of a photograph attached to this application. As understood by FIG. 4 and the photograph, the output result using the conventional error diffusion includes thick painted portions K1 and K2, whereas the output result generated by the halftone gradation processing method of the present invention reproduces a high quality image without a thick painted portion.

The halftone gradation processing method of the present invention may become an independent trading medium as a computer program stored in a recording medium, such as a CD-ROM and a floppy disc. Clearly, those computers 100 which preinstall the program in the hard disc 104 are within the scope of the present invention.

Following is a computer program as one example of the halftone gradation processing method used for the present invention:

```
class penaltymember : public member {
protected:
    virtual void initlist(int,int *);
    virtual int searchnear(double);
public:
    penaltymember() { type = PenaltyType; };
    penaltymember (ppm &, int, int *, Color *);
    virtual void init(ppm &appm, int len, int *list, Color *acolor)
        {
#ifdef PROCTRACE
        fprintf(debugout, "in penalty member¥n");
#endif
        ymc=acolor;
        initlist(len,list);
        }
    virtual void near(int, double, int, int);
    virtual int getidx() { return idx; }
    virtual int *getpenaltybit () {return penaltybit; }
};
/*
Converting Class with Penalty
*/
class PenaltyProcess: public Process {
protected:
    //penaltymember *table;
    int penaltyidx[2];
    inline int currentpenalty();
    void setuppenaltybuf();
    void cycle_penalty();
    virtual void deliverpenalty(int);
    int *penaltybase[2];
public:
    int *penalty[2];
    PenaltyProcess() {type=PenaltyProcessType;};
    virtual void init(ppm&, Member*, ErrorDeliver*, Filter*, Color*, unsigned char*);
};
penaltymember : :penaltymember (ppm &appm, int ten, int *list, Color *acolor) {
    init(appm, len, list, acolor);
}
void penaltymember : : initlist (int len, int *list) {
    int i, j;
    int *bp;
    set_memberlist(list);
    set_memberlist(len);
    panishlist = new int [len];
    for (bp=panishlist;bp<panishlist + len;bp ++) {
        *bp=0;
    }
    penaltybit = new int [len];
    for (i=0; i<len; i++) {
        penaltybit [i]= 1 << i;
    }
    numberofmatrix= 1 << len;
    pmatrix = new int*[number of matrix];
    for (i=0;i<numberofmatrix;i++) {
        for (j=0;j<len;j++) {
            if (i &(1 <<j)){
                panishlist[j] = 0;
            } else {
            panishlist[j] = 1;
            }
        }
        pmatrix[i] = new int[256] ;
        for (j=0;j<256;j++) {
            pmatrix[i][j] = searchnear(j);
        }
    }
}
//return the closest value to the given real number value
void penal tymember::near(int pix,double err, int x,int y) {
    double distance, ds;
    double d;
    d = pix + err;
    if (d < memberlist[0] ) {
        idx = 0;
    } else if (d > memberlist[memberlength-1] ) {
        idx = memberlength-1;
    } else {
        idx = pmatrix[panishidx][(int)d] ;
```

```
        }
        error = d - memberlist[idx] ;
        pixel = memberlist[idx] ;
    }
}
//return memberlist's index that is the closet to the given value
int penaltymember::searchnear(double d) {
    int distance,ds
    int i;
    distance = d -memberlist[0] ;
    distance =distance * distance;
    idx = 0;
    panishlist [0]= 1;
    panishlist[memberlength-1] = 1;
    for (i=0;i<memberlength;i++) {
        if (panishlist[i] ) {
            ds = d - memberlist[i] ;
            ds = ds * ds;
            if (ds < distance) {
                distance = ds;
                idx = i;
            }
        }
    }
    return idx;
}
void PenaltyProcess::init(ppm &adata, Member *amember, ErrorDeliver *aed,
                        Filter *afilter,Color *acolor,unsigned char *edbase)
{
    data = adata;
    table = amember;
    ed = aed;
    filter = afilter;
    ymc = acolor;
    setuperrorbuf();
    setuppenaltybuf();
    edbuffer = edbasc;
}
inline int Penalty Process:: currentpenalty() {
    return (*(penalty[penaltyidx[0] ] + x * data.bytewidth + color));
}
void PenaltyProcess::setuppenaltybuf() {
    int i;
    int *bp;
    for (i=0;i<2;i++) {
        penaltybase[i] = new int[data.xlines+2];
        bp = penaltybase[i];
        while (bp<penaltybase[i]+data.xlines +2) {
            *bp++ = 0;
        }
        penaltyidx[i]= i;
        if (penaltybase[i] == (int *)NULL) {
            fprintf(stderr,"Can't allocale memory¥n");
            fprintf(stderr,"%d x %dYn",data.xsize,data.bytewidth*sizcof(int));
            exit(2);
        }
        penalty[i] = penaltybase[i] + 1;
    }
}
void PenaltyProcess::cycle penalty() {
    int tmp,i;
    int *bp;
    tmp = penaltyidx[0];
    penaltyidx[0] = penaltyidx[1];
    penaltyidx[1] = tmp;
    // Clear buffer
    bp = penaltybase[penalyidx[1]];
    while (bp<penaltybase[penaltyidx[1]]+data.xlines+2) {
        *bp++ = 0;
    }
}
void PenaltyProcess::deliverpenalty(int v) {
    *(penalty[penaltyidx[0]] + (x+1) * data.bytewidth + color) |= v; // right
    *(penalty[penaltyidx[1]] + x * data.bytewidth + color) |= v; // down
}
```

Figure 5:
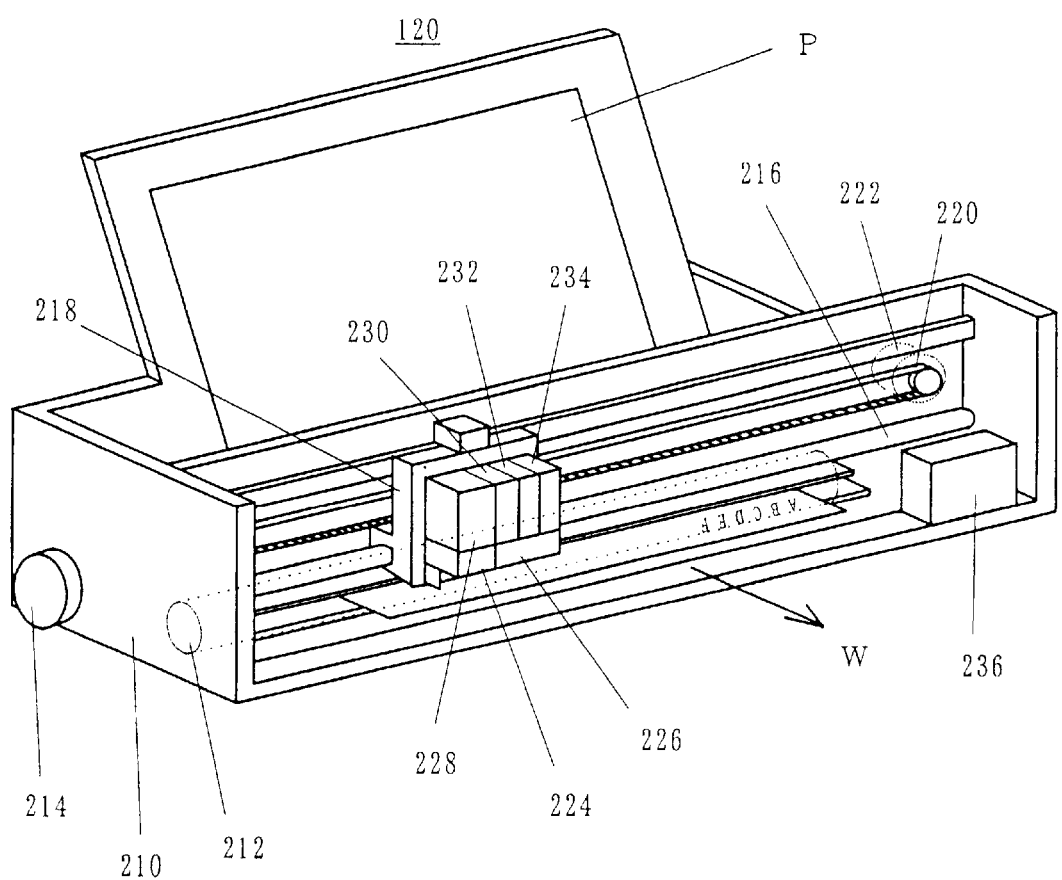
FIG. 5 is a schematic perspective view for explaining one example of a printer which executes executing the halftone gradation processing method shown in FIG. 1.

Referring to FIG. 5, a description will be given of an exemplified concrete structure of an inkjet printer to which the halftone gradation processing method of the present invention is applicable. FIG. 5 shows a schematic embodiment of the color inkjet printer (recording device) 120. The halftone gradation processing method of the present invention may be stored in the memories 104 and 110 in the computer 100, but may also be stored in a ROM (not shown) in the recording device 120. In this case, the recording device 120 performs the halftone gradation processing method of the present invention.

Platen 212 is pivotally provided in housing 21.0 in the recording device 120. During the recording operation, the platen 212 is intermittently driven and rotated by drive motor 214, thereby intermittently feeding recording paper P by a predetermined pitch in direction W. Guide rod 216 is provided above and parallel to the platen 212 in the recording device housing 210, and the carriage 218 is provided in a slidable manner above the guide rod 216.

The carriage 218 is attached to end-free drive belt 220, while the end-free drive belt 220 is driven by the drive motor 222. Thereby, the carriage 218 reciprocates (scans) along the platen 212.

The carriage 218 includes recording head 224 for monochromatic (i.e., black-color) printing and recording head 226 for multicolor printing. The recording head 226 for multicolor printing may include three components. The recording head 224 for monochromatic printing detachably includes black color ink tank 228, while the recording head 226 for multicolor printing detachably includes color ink tanks 230, 232 and 234.

The black color ink tank 228 accommodates black color ink, while the color ink tanks 230, 232 and 234 respectively accommodate yellow .ink, cyan ink, and magenta ink.

While the carriage 218 reciprocates along the platen 212, the recording head 224 for monochromatic printing and the recording head 226 for multicolor printing are driven using the halftone gradation processing method of the present invention, recording predetermined letters and images on the recording paper P corresponding to the image data provided from the word processor, personal computer, etc. When the recording operation stops, the carriage 218 returns to a home position where a nozzle maintenance mechanism (back-up unit) 236 is provided.

The nozzle maintenance mechanism 236 includes a movable suction cap (not shown) and a suction pump (not shown) connected to this movable suction cap. The recording heads 224 and 226 are positioned at the home position, the suction cap is adhered to the nozzle plate in each recording head and absorbs nozzle in the nozzle plate by driving the suction pump, so as to prevent any clog in the nozzle.

Further, the present invention is not limited to these preferred embodiments, but various variations and modifications may be made without departing from the scope of the present invention.

The halftone gradation processing method of the present invention allows continuous gradation reproduction of an image, reducing or eliminating a thick painted portion as typically seen in the conventional error diffusion. Therefore, in comparison with the conventional error diffusion, the halftone gradation processing method of the present invention enables the output device to provide more a faithful reproduction of an input image having gradations more than the output device.

What is claimed is:

1. A halftone gradation processing method, comprising:

obtaining a position and a pixel value of a target pixel in an input image;

correcting the pixel value;

selecting a closest threshold to the corrected pixel value from among usable thresholds assignable to said pixel value;

calculating an error between the corrected pixel value and the selected threshold;

diffusing the error around the target pixel, said correcting being corrected by the diffused error, and the selected threshold being output to an output device which may handle the assigned thresholds; and prohibiting use of the threshold selected with respect to the target pixel for at least one pixel among pixels around the target pixel.

2. A halftone gradation processing method, comprising:

obtaining a position and a pixel value of a target pixel in an input image;

correcting the pixel value;

selecting a closest threshold to the corrected pixel value from among usable thresholds assignable to said pixel value;

calculating an error between the corrected pixel value and the selected threshold;

diffusing the error around the target pixel, said correcting being corrected by the diffused error and the selected threshold being output to an output device which may handle the assigned thresholds; and prohibiting use of the threshold selected with respect to the target pixel for at least one pixel among pixels around the target pixel, wherein said prohibiting does not prohibit the maximum value among the assigned thresholds.

3. A halftone gradation processing, comprising:

obtaining a position and a pixel value of a target pixel in an input image;

correcting the pixel value;

selecting a closest threshold to the corrected pixel value from among usable thresholds assignable to said pixel value;

calculating an error between the corrected pixel value and the selected threshold;

diffusing the error around the target pixel, said correcting being corrected by the diffused error and the selected threshold being output to an output device which may handle the assigned thresholds; and prohibiting use of the threshold selected with respect to the target pixel for at least one pixel among pixels around the target pixel, wherein said prohibiting does not prohibit the minimum value among the assigned thresholds.

4. A computer-readable recording medium which stores a halftone gradation processing method comprising:

obtaining a position and a pixel value of a target pixel in an input image;

correcting said pixel value;

selecting a closest threshold to the corrected pixel value from among usable thresholds assignable to said pixel value;

calculating an error between the corrected pixel value and the selected threshold;

diffusing the error around the target pixel, said pixel value correcting being corrected by the diffused error; and prohibiting use of the threshold selected with respect to the target pixel for at least one pixel among pixels around the target pixel.

5. A recording device, comprising:

a computer-readable recording medium which stores a halftone gradation processing method comprising:

obtaining a position and a pixel value of a target pixel in an input image, correcting said pixel value, selecting the closest threshold to the corrected pixel value from among usable thresholds assignable to said pixel value, calculating an error between the corrected pixel value and the selected threshold, diffusing the error around the target pixel, said correcting being corrected by the diffused error, and prohibiting use of the threshold selected with respect to the target pixel for at least one pixel among pixels around the target pixel.

6. A recording device according to claim 5, wherein said recording device is a multiple gradation printer which may output three gradations.

* * * * *